(No Model.)
J. W. WOLFE.
DRAFT EQUALIZER.
No. 346,080. Patented July 20, 1886.
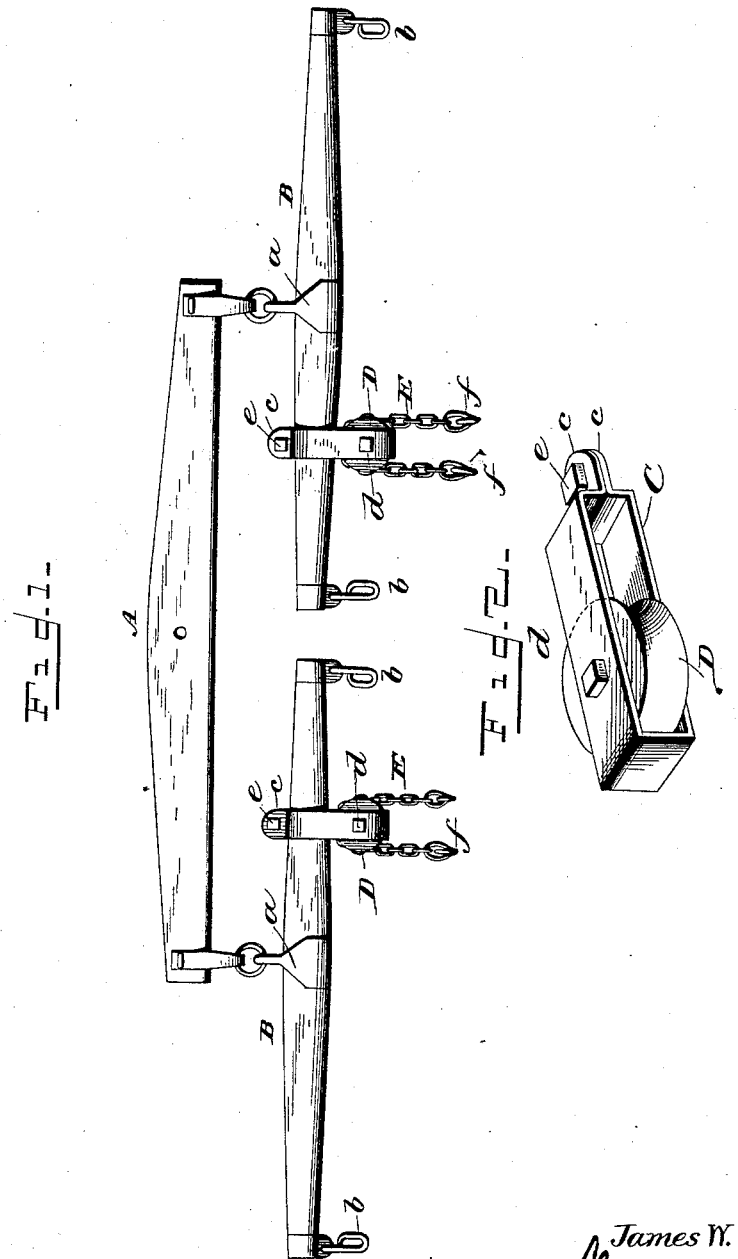
WITNESSES
James W. Wolfe.
INVENTOR
Attorney

UNITED STATES PATENT OFFICE.

JAMES W. WOLFE, OF OAK GROVE, MICHIGAN, ASSIGNOR OF ONE-HALF TO WILLIAM H. McMILLAN, OF SAME PLACE.

DRAFT-EQUALIZER.

SPECIFICATION forming part of Letters Patent No. 346,080, dated July 20, 1886.

Application filed June 3, 1886. Serial No. 204,070. (No model.)

*To all whom it may concern:*

Be it known that I, JAMES W. WOLFE, a citizen of the United States of America, residing at Oak Grove, in the county of Livingston and State of Michigan, have invented certain new and useful Improvements in Draft-Equalizers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in attachments for whiffletrees, the object of my invention being to provide a device which can be attached to doubletrees, so as to adapt the same for use as a three-horse draft-equalizer; and to this end my invention consists in the construction and combination of the parts, as will be hereinafter fully set forth, and specifically pointed out in the claim.

In the accompanying drawings, which illustrate my invention, Figure 1 is a plan view of a double-tree, showing my invention applied thereto; and Fig. 2 is a detail perspective view.

A refers to the single or whiffle tree, to which the double-trees B B are attached in the usual manner, said double-trees being provided at their ends with clips and hooks $b$. The double-trees B B are attached to the single-tree A at their centers by clips $a$ and the usual coupling-rings.

C refers to a flat strap or bar of metal, which is bent upon itself, as shown, so as to form a boxing, within the forward end of which is located a grooved pulley, D, said pulley being connected to the strap by a bolt, $d$. The ends of the strap are bent outwardly, as shown at $c$, said ends being provided with perforations, through which pass a bolt, $e$. The strap is so bent that the ends $c\ c$ will have a tendency to open or spring apart from each other when the bolt $e$ is loosened.

When it is desired to convert the doubletrees into a three-horse draft-equalizer, the block or straps C are inserted over the inner ends of the whiffletrees B, and clamped thereon by means of the bolt $e$, which will draw the ends together, so as to securely hold the same in position. Short chains E, which are provided at their ends with hooks $f$, are passed around the pulleys D, and the traces are attached to these hooks in the usual manner. If desirable, short chains may be attached to the outer ends of the whiffletrees.

It will be noted that when three horses are attached to the device that the hooks $b\ b$ at the inner ends of the whiffletrees are not used.

This device is especially adapted for use with agricultural implements—as plows and harrows—where it is desired to hitch three horses to the implement where two horses are ordinarily employed, and the three horses will be hitched closely to each other side by side, so as to not take up more space than is usually occupied by a pair of horses.

The device hereinbefore described is simple in construction and effective in operation, and by the use of the same each horse is compelled to do his share of the work.

I claim—

In combination with the double-trees B B, the strap C, bent upon itself, as shown, and provided with a grooved pulley, D, over which passes a chain with hooks $f\ f$, said pulley being secured to the strap by a bolt, $d$, the outwardly-bent ends $c\ c$, and a clamp-bolt, $e$, whereby the strap can be attached to the whiffletree, substantially as shown, and for the purpose set forth.

In testimony whereof I affix my signature in presence of two witnesses.

JAMES W. WOLFE.

Witnesses:
ALBERT THOMPSON,
NEWTON S. KIRK.